(12) United States Patent
Hoshi et al.

(10) Patent No.: US 9,178,406 B2
(45) Date of Patent: Nov. 3, 2015

(54) LINEAR MOTOR AND STAGE DEVICE

(75) Inventors: Toshiyuki Hoshi, Kitakyushu (JP); Kenji Watanabe, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 365 days.

(21) Appl. No.: 13/238,409

(22) Filed: Sep. 21, 2011

(65) Prior Publication Data
US 2012/0086287 A1    Apr. 12, 2012

(30) Foreign Application Priority Data
Oct. 7, 2010 (JP) ................................ 2010-227325

(51) Int. Cl.
*H02K 41/02* (2006.01)
*H02K 41/03* (2006.01)
*H02K 5/20* (2006.01)
*H02K 9/19* (2006.01)

(52) U.S. Cl.
CPC ............... *H02K 41/031* (2013.01); *H02K 5/20* (2013.01); *H02K 9/19* (2013.01); *H02K 2201/18* (2013.01); *H02K 2213/03* (2013.01)

(58) Field of Classification Search
CPC .......... H02K 5/20; H02K 9/19; H02K 41/02; H02K 41/032; H02K 2201/18; H02K 2213/03
USPC ................ 310/12.05, 12.06; 355/53
IPC ...................................... H02K 41/02
See application file for complete search history.

(56) References Cited

U.S. PATENT DOCUMENTS

| | | | | |
|---|---|---|---|---|
| 6,084,319 A | * | 7/2000 | Kamata et al. | 310/12.29 |
| 6,252,314 B1 | * | 6/2001 | Ebinuma | 310/12.06 |
| 6,952,254 B2 | * | 10/2005 | Korenaga | 355/72 |
| 2004/0130688 A1 | * | 7/2004 | Emoto | 355/30 |
| 2008/0246348 A1 | * | 10/2008 | Angelis et al. | 310/12 |
| 2009/0315414 A1 | * | 12/2009 | Shikayama et al. | 310/12.29 |
| 2012/0086287 A1 | * | 4/2012 | Hoshi et al. | 310/12.05 |

FOREIGN PATENT DOCUMENTS

| | | |
|---|---|---|
| JP | 11-018406 | 1/1999 |
| JP | 2007-318823 | 12/2007 |

(Continued)

OTHER PUBLICATIONS

"Magnetic Circuit", Britanica Encyclopaedia, 2014.*
(Continued)

*Primary Examiner* — John K Kim
(74) *Attorney, Agent, or Firm* — Mori & Ward, LLP

(57) ABSTRACT

A linear motor includes a field magnet and an armature. The field magnet includes a pair of opposing field magnet yokes. A yoke base is disposed on a first end of each field magnet yoke in a Y axis direction. Between the field magnet yokes, a first magnet row is disposed including, along an X axis direction, a plurality of opposing pairs of first magnets having different polarities. Between the field magnet yokes, a second magnet row is disposed to a first side or a second side of the first magnet row in the Y axis direction. The second magnet row includes a pair of opposing second magnets having different polarities and forming a single row in the Y axis direction on the field magnet yokes. The armature includes a first armature coil opposite the first magnet row and a second armature coil opposite the second magnet row.

7 Claims, 6 Drawing Sheets

(56) References Cited

FOREIGN PATENT DOCUMENTS

| | | |
|---|---|---|
| JP | 2008-245491 | 10/2008 |
| JP | 2010-074976 | 4/2010 |

OTHER PUBLICATIONS

Extended European Search Report for corresponding EP Application No. 11180430.8-1242, Oct. 12, 2012.

Japanese Office Action for corresponding JP Application No. 2010-227325, Dec. 3, 2013.

Chinese Office Action for corresponding CN Application No. 201110301771.0, Oct. 29, 2013.

Taiwanese Office Action for corresponding TW Application No. 100134792, Oct. 24, 2014.

Korean Office Action for corresponding KR Application No. 10-2011-0102160, Jun. 27, 2014.

* cited by examiner

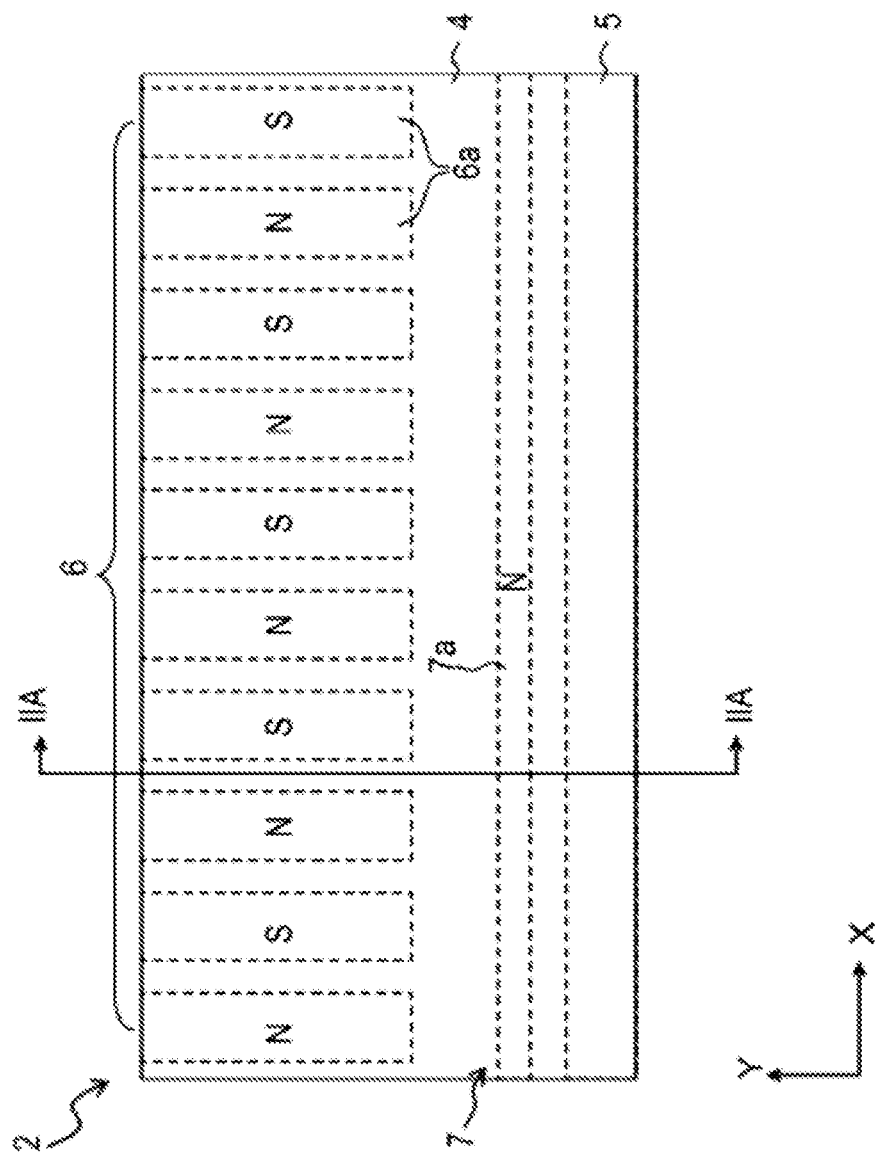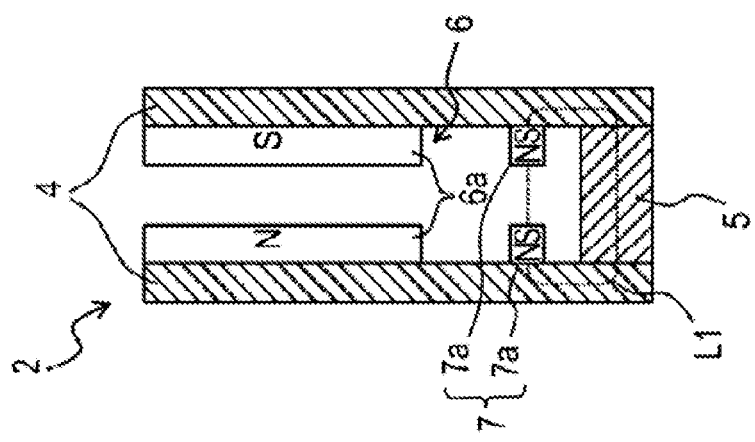

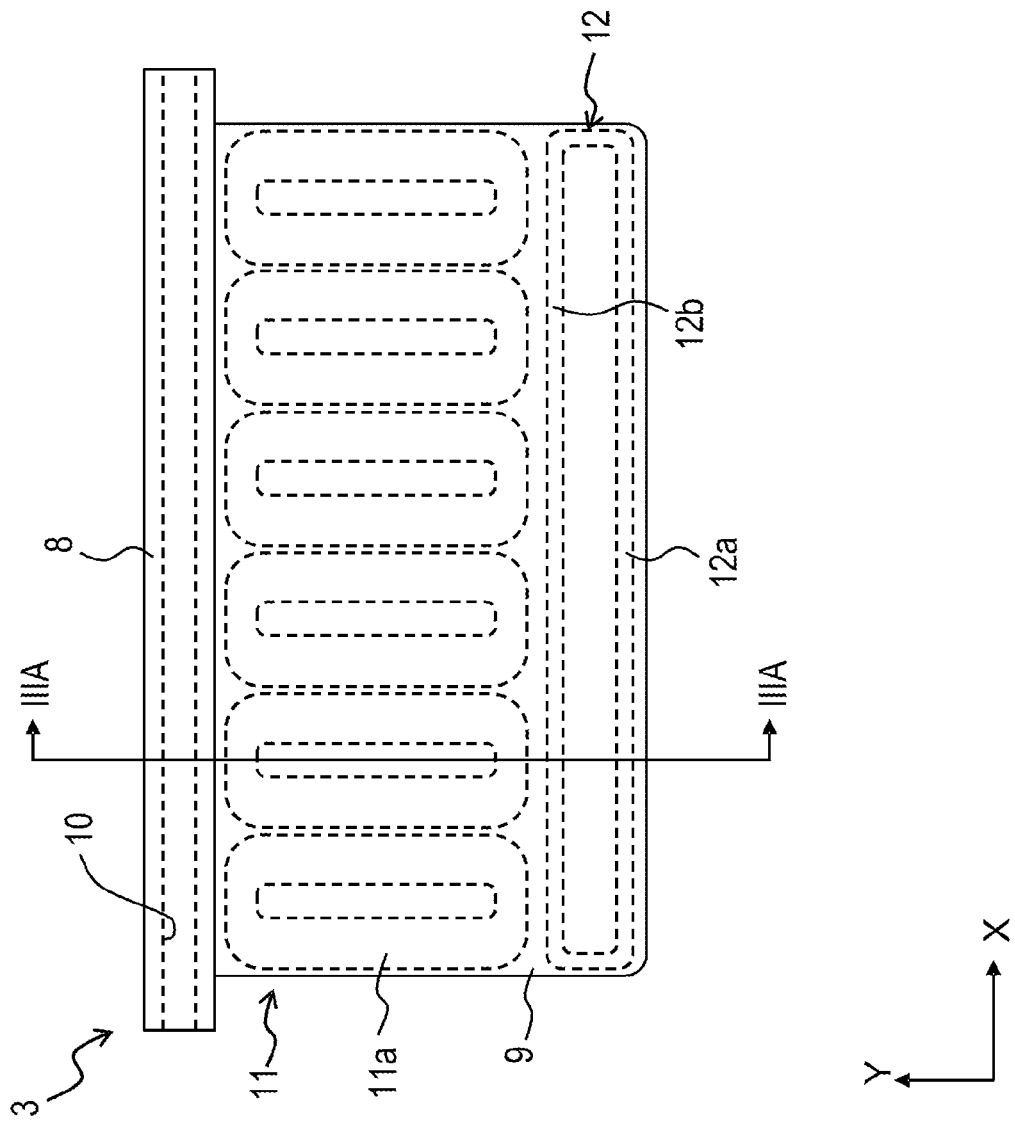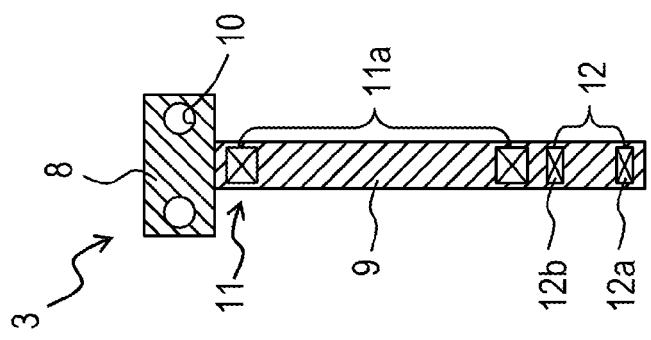

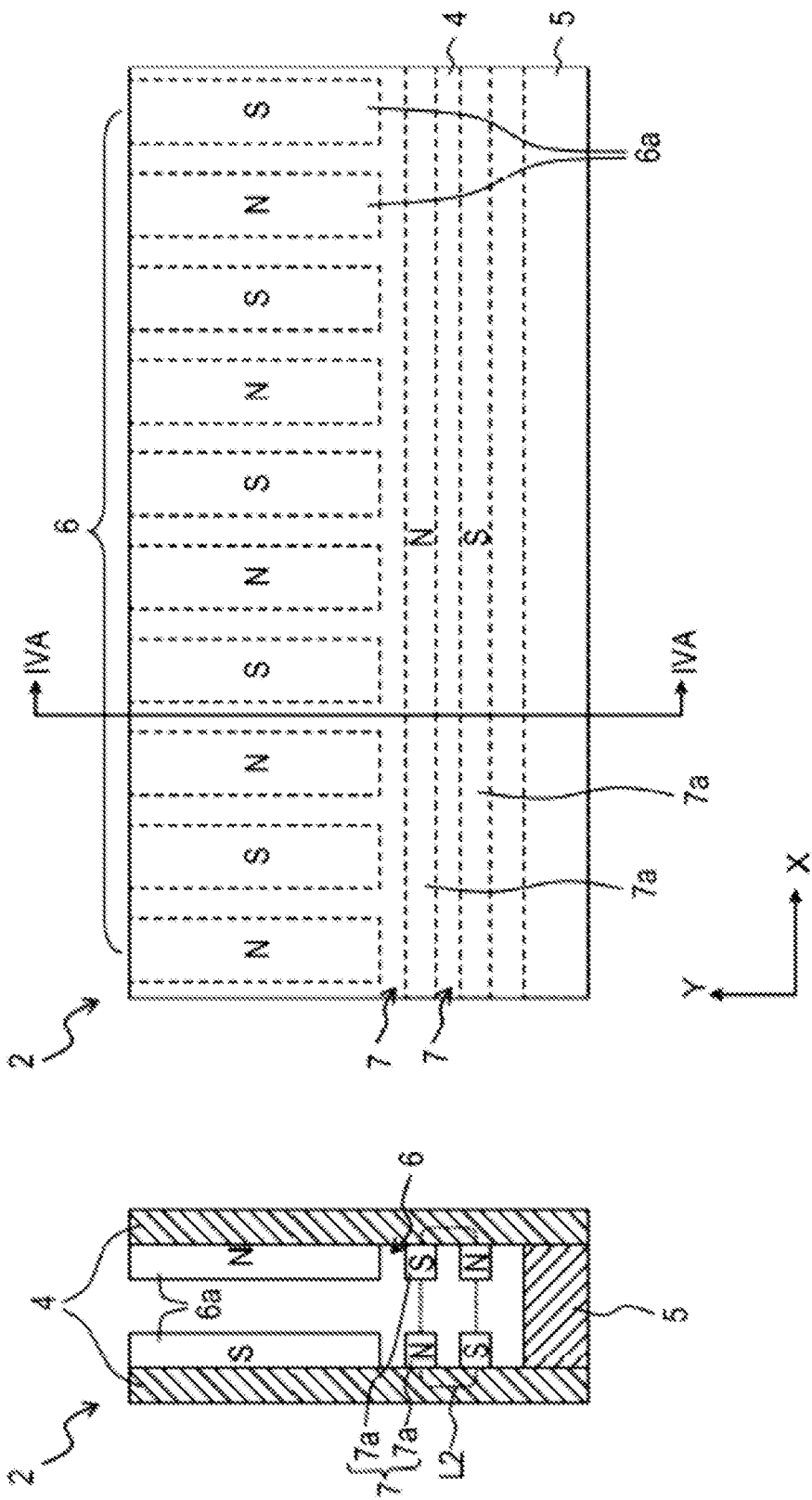

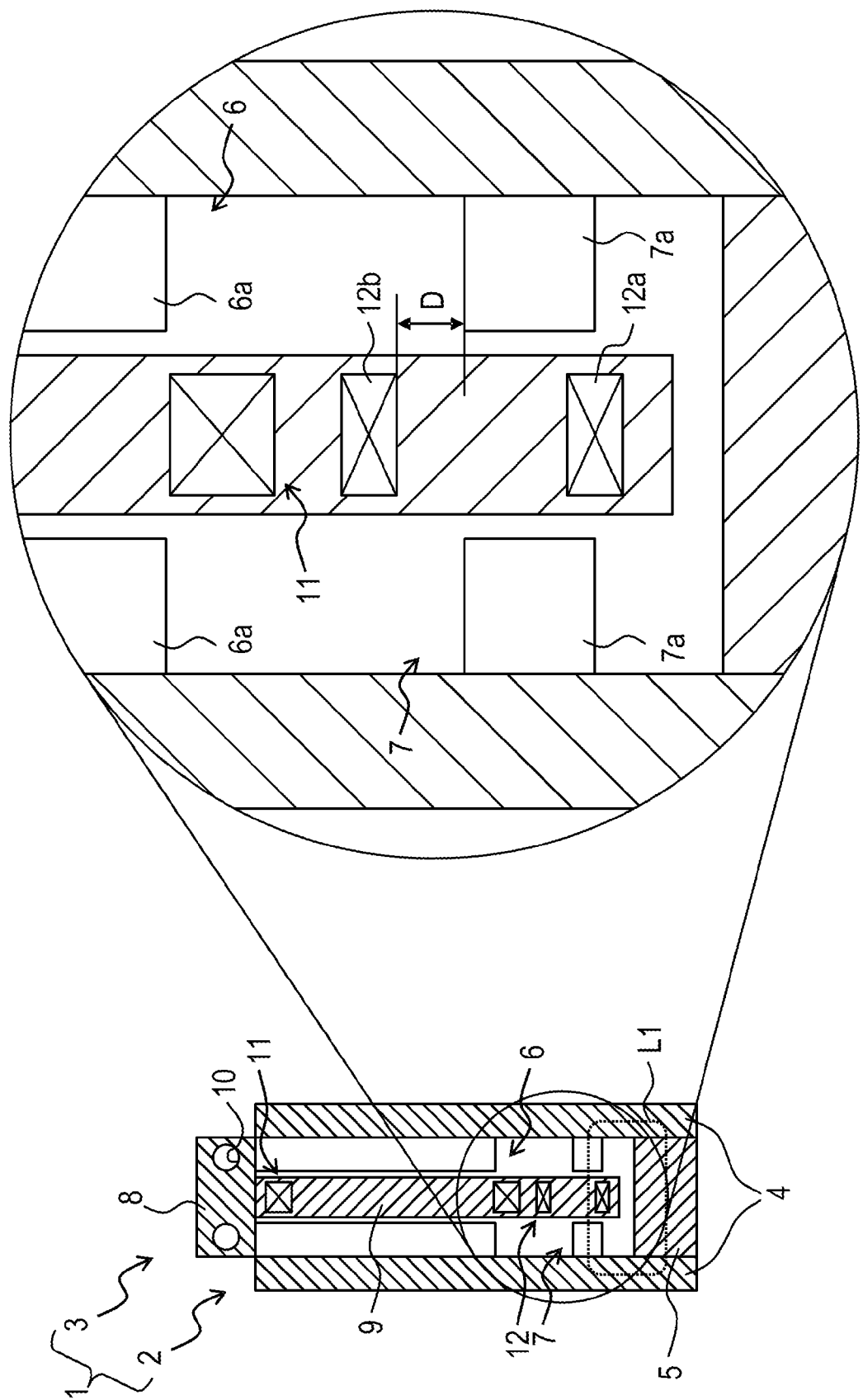

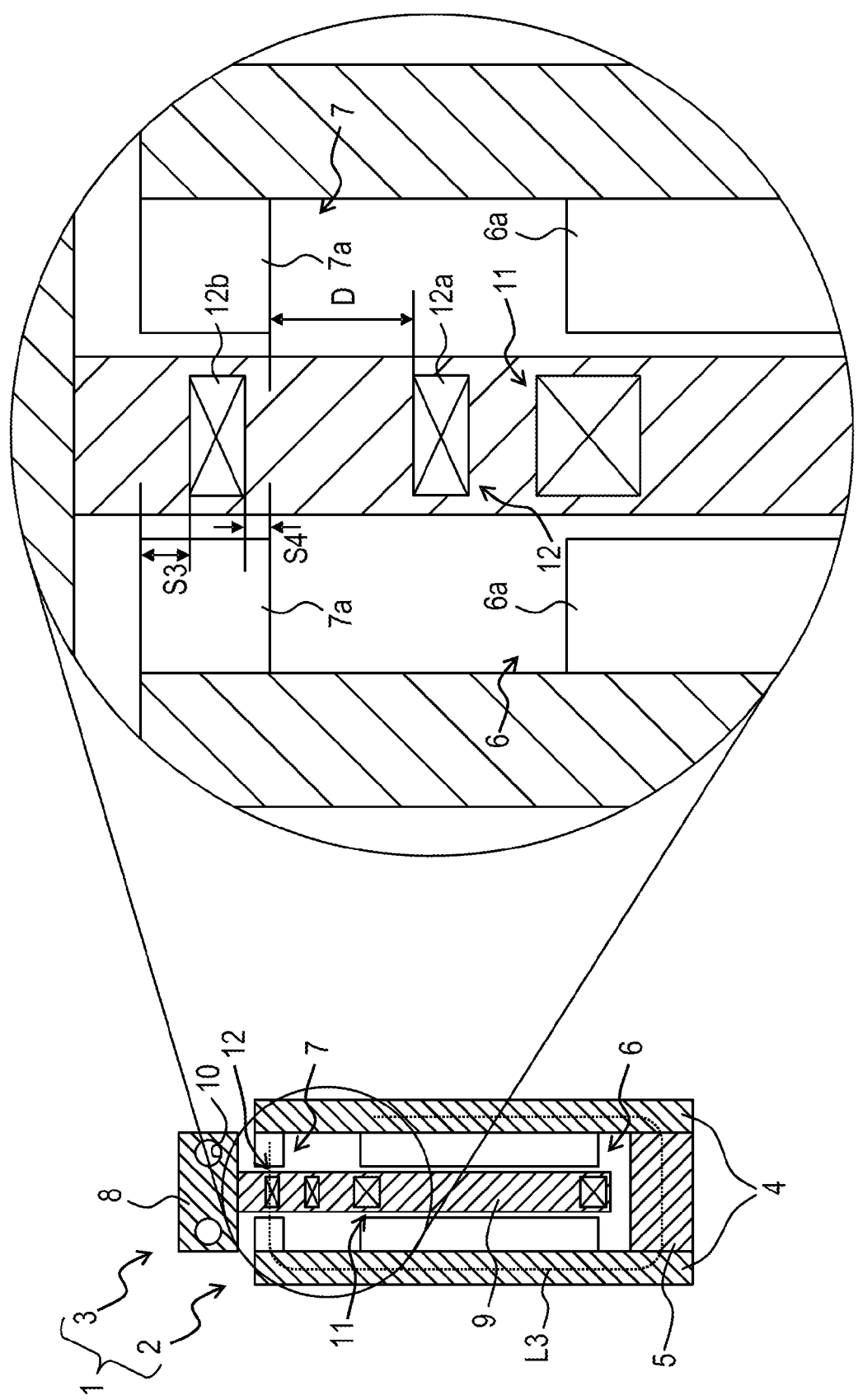

LINEAR MOTOR AND STAGE DEVICE

CROSS-REFERENCE TO RELATED APPLICATIONS

The present application claims priority under 35 U.S.C. §119 to Japanese Patent Application No. 2010-227325, filed Oct. 7, 2010. The contents of this application are herein incorporated by reference in their entirety.

BACKGROUND OF THE INVENTION

1. Field of the Invention

The present invention relates to a linear motor and a stage device.

2. Discussion of the Background

Japanese Unexamined Patent Application Publication No. 2010-74976 discloses a linear motor that allows for biaxial driving in X and Y axes.

This linear motor includes a field magnet and an armature. The field magnet includes a first magnet row and a second magnet row. The armature includes a first armature coil row and a second armature coil row. The first armature coil row is opposite the first magnet row of the field magnet, while the second armature coil row is opposite the second magnet row of the field magnet. The first magnet row includes a plurality of opposing pairs of first magnets. The opposing pairs of first magnets are disposed between a pair of planar field magnet yokes of the field magnet along the X axis direction. The second magnet row includes two opposing pairs of second magnets disposed to one side of the first magnet row in the Y axis direction (on the yoke open side). The two opposing pairs of second magnets form two rows along the Y axis direction.

SUMMARY OF THE INVENTION

According to one aspect of the present invention, a linear motor has an X axis direction and a Y axis direction orthogonal to the X axis direction. The linear motor includes a field magnet and an armature. The field magnet serves as one of a rotor and a stator. The rotor is movable in the X axis direction and the Y axis direction. The field magnet includes a pair of planar, mutually opposing field magnet yokes, a yoke base, a first magnet row, and a second magnet row. The yoke base is on a first end of each of the pair of field magnet yokes in the Y axis direction. The first magnet row is between the pair of field magnet yokes. The first magnet row includes a plurality of mutually opposing pairs of first magnets along the X axis direction. The first magnets of each of the pairs have mutually different polarities. The second magnet row is between the pair of field magnet yokes. The second magnet row is to at least one of a first side and a second side of the first magnet row in the Y axis direction. The second magnet row includes a pair of mutually opposing second magnets having mutually different polarities. The pair of mutually opposing second magnets form a single row in the Y axis direction on each of the pair of field magnet yokes. The armature serves as another one of the rotor and the stator. The armature includes a first armature coil and a second armature coil. The first armature coil is opposite the first magnet row. The second armature coil is opposite the second magnet row.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A and 2B are diagrams illustrating a schematic configuration of a field magnet: FIG. 2A is a cross-sectional view of the field magnet taken along the line IIA-IIA of FIG. 2B; and FIG. 2B shows the field magnet as viewed from a side in a direction orthogonal to the X axis direction;

FIGS. 3A and 3B are diagrams illustrating a schematic configuration of an armature: FIG. 3A is a cross-sectional view of the armature taken along the line IIIA-IIIA of FIG. 3B; and FIG. 3B shows the armature as viewed from a side in a direction orthogonal to the X axis direction;

FIGS. 4A and 4B are diagrams illustrating a schematic configuration of a field magnet according to a comparative embodiment: FIG. 4A is a cross-sectional view of the field magnet according to the comparative embodiment taken along the line IVA-IVA of FIG. 4B; and FIG. 4B shows the field magnet according to the comparative embodiment as viewed from a side in a direction orthogonal to the X axis direction;

FIG. 5 is a diagram illustrating a distance between a second coil side portion and a second magnet row in the case where the armature makes a relative movement, in relation to the field magnet, from the position shown in FIG. 1 to a first side in a Y axis direction; and FIG. 6 is a cross-sectional view of a linear motor, taken along a direction orthogonal to the X axis direction to illustrate a schematic configuration of the linear motor, according to a modification embodiment where the second magnet row is disposed to the second side of a first magnet row in the Y axis direction.

DESCRIPTION OF THE EMBODIMENTS

Figure 1:
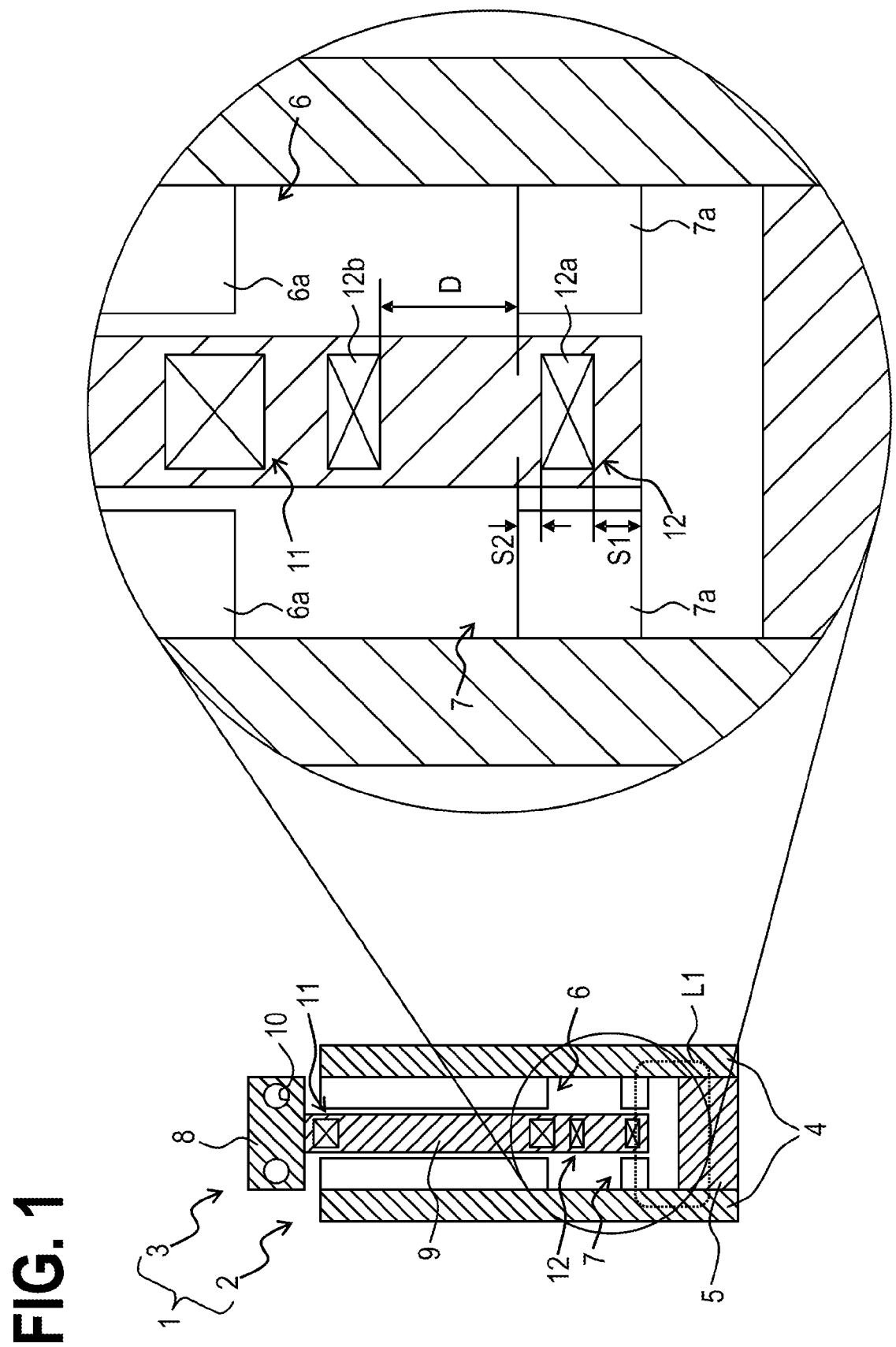
FIG. 1 is a cross-sectional view of a linear motor according to an embodiment, taken along a direction orthogonal to an X axis direction to illustrate a schematic configuration of the linear motor.

The embodiments will now be described with reference to the accompanying drawings, wherein like reference numerals designate corresponding or identical elements throughout the various drawings.

FIG. 1 is a cross-sectional view of a linear motor 1 according to an embodiment, taken along a direction orthogonal to an X axis direction to illustrate a schematic configuration of the linear motor 1.

As shown in FIG. 1, the linear motor 1 is what is called a coreless linear motor. The linear motor 1 includes a field magnet 2 serving as a stator and an armature 3 serving as a rotor. In the linear motor 1, the armature 3, which serves as the rotor, is drivable (movable) biaxially in the X axis direction (which is the direction perpendicular to the paper plane of FIG. 1, detailed later) and in the Y axis direction (which is a vertical direction of FIG. 1, detailed later) orthogonal to the X axis direction.

FIGS. 2A and 2B are diagrams illustrating a schematic configuration of the field magnet 2: FIG. 2A is a cross-sectional view of the field magnet 2 taken along the line IIA-IIA of FIG. 2B; and FIG. 2B shows the field magnet 2 as viewed from a side in a direction orthogonal to the X axis direction.

As shown in FIGS. 2A, 2B, and 1, the field magnet 2 includes a pair of planar field magnet yokes 4, a yoke base 5, a first magnet row 6, and a second magnet row 7. The yoke base 5 supports (secures) the pair of field magnet yokes 4 approximately in parallel to one another in opposing orientation. The first magnet row 6 includes a plurality of pairs (10 pairs in this embodiment) of X-axis permanent magnets 6a (first magnets), the permanent magnets 6a of each pair having mutually different polarities. The second magnet row 7 includes a pair of Y-axis permanent magnets 7a (second magnets) having mutually different polarities. Each of the Y-axis permanent magnets 7a forms a single row in the Y axis direction on each of the pair of field magnet yokes 4.

The pair of field magnet yokes 4 are made of magnetic material such as iron, and disposed approximately in parallel in opposing orientation across the yoke base 5. The longitudinal direction of the pair of field magnet yokes 4 (which is the direction perpendicular to the paper plane of FIGS. 1 and 2A and the lateral direction of FIG. 2B) corresponds to the X axis direction, while the direction orthogonal to the longitudinal direction of the pair of field magnet yokes 4 (the vertical direction of FIGS. 1, 2A, and 2B) corresponds to the Y axis direction.

The yoke base 5 is made of magnetic material such as iron, and disposed between the pair of field magnet yokes 4 and on a first side of each of the pair of field magnet yokes 4 in the Y axis direction (on the lower side of FIGS. 1, 2A, and 2B), so as to support the pair of field magnet yokes 4.

The pair of X-axis permanent magnets 6a are disposed in opposing orientation on the opposing surfaces of the pair of field magnet yokes 4 (in other words, on the inner surfaces of the pair of field magnet yokes 4) and on a second side of the pair of field magnet yokes 4 in the Y axis direction (on the upper side of FIGS. 1, 2A, and 2B). Specifically, the first magnet row 6 is disposed on the second side of the pair of field magnet yokes 4 in the Y axis direction, and has the plurality of pairs (10 pairs in this embodiment) of X-axis permanent magnets 6a disposed in opposing orientation on the opposing surfaces of the pair of field magnet yokes 4 at equal intervals along the X axis direction. Additionally, the plurality of pairs of X-axis permanent magnets 6a have alternately inverted polarities in the X axis direction. Thus, the plurality of pairs of X-axis permanent magnets 6a are disposed on the inner surfaces of the pair of field magnet yokes 4 and on the second side of the pair of field magnet yokes 4 in the Y axis direction. In other words, the plurality of pairs of X-axis permanent magnets 6a are disposed on the open side of the pair of field magnet yokes 4. More specifically, in the first magnet row 6, the polarities of the plurality of X-axis permanent magnets 6a arranged on one of the pair of field magnet yokes 4 alternate in, for example, such a manner as south pole→north pole→south pole→north pole→and so forth. Inversely, the polarities of the plurality of X-axis permanent magnets 6a arranged on the other one of the pair of field magnet yokes 4 alternate in such a manner as north pole→south pole→north pole→south pole→and so forth. Arranging the plurality of pairs of X-axis permanent magnets 6a of the first magnet row 6 in this manner results in a closed loop of magnetic field for X axis driving (not shown) formed by adjacent two pairs of X-axis permanent magnets 6a.

The pair of Y-axis permanent magnets 7a are disposed in opposing orientation on the opposing surfaces of the pair of field magnet yokes 4 (in other words, on the inner surfaces of the pair of field magnet yokes 4) and to a first side of the first magnet row 6 in the Y axis direction (on the lower side of FIGS. 1, 2A, and 2B). Specifically, the second magnet row 7 has its pair of Y-axis permanent magnets 7a disposed in opposing orientation along the X axis direction (throughout the X axis length) on the inner surfaces of the pair of field magnet yokes 4 and to the first side of the first magnet row 6 in the Y axis direction. Thus, the pair of Y-axis permanent magnets 7a are disposed on the inner surfaces of the pair of field magnet yokes 4 and to the first side of the first magnet row 6 in the Y axis direction. In other words, the pair of Y-axis permanent magnets 7a are disposed on the side where the pair of field magnet yokes 4 are closed by the yoke base 5. More specifically, in the second magnet row 7, one of the pair of Y-axis permanent magnets 7a disposed on one of the pair of field magnet yokes 4 is north polarized, for example. Inversely, the other one of the pair of Y-axis permanent magnets 7a arranged on the other one of the pair of field magnet yokes 4 is south polarized. The pair of Y-axis permanent magnets 7a of the second magnet row 7 and the yoke base 5 form a closed loop L1 of magnetic field for Y axis driving. The second magnet row 7 will be described in detail later.

FIGS. 3A and 3B are diagrams illustrating a schematic configuration of the armature 3: FIG. 3A is a cross-sectional view of the armature 3 taken along the line IIIA-IIIA of FIG. 3B; and FIG. 3B shows the armature 3 as viewed from a side in a direction orthogonal to the X axis direction. In FIG. 3A, the direction perpendicular to the paper plane corresponds to the X axis direction, while the vertical direction corresponds to the Y axis direction. In FIG. 3B, the lateral direction corresponds to the X axis direction, while the vertical direction corresponds to the Y axis direction.

As shown in FIGS. 3A, 3B, and 1, the armature 3 includes a planar substrate 9 and an armature base 8 that secures a table, not shown, on which a load, not shown, is to be placed.

The substrate 9 is disposed in opposing orientation with respect to the first and second magnet rows 6 and 7 of the field magnet 2 across a magnetic gap. In other words, the substrate 9 is disposed in the air gap between the first and second magnet rows 6 and 7. The substrate 9 includes a first armature coil row 11 and a single-phase coil 12 (second armature coil). The first armature coil row 11 includes a row of a plurality of (six in this embodiment) AC (Alternating Current) three-phase coils 11a (first armature coils) each having electrical phase differences of, for example, 120 degrees.

The first armature coil row 11 has its plurality of (six in this embodiment) of AC three-phase coils 11a disposed in the substrate 9 opposite the first magnet row 6 of the field magnet 2 and at equal intervals along the X axis direction. The AC three-phase coils 11a are each molded into a plate shape by resin molding and secured (disposed) in the substrate 9.

The single-phase coil 12 is disposed to a first side of the first armature coil row 11 in the Y axis direction (on the lower side of FIGS. 1, 3A, and 3B). Specifically, the single-phase coil 12 is disposed in the substrate 9 opposite the second magnet row 7 of the field magnet 2 and along the X axis direction (throughout the X axis length). The single-phase coil 12 is molded into a plate shape by resin molding and secured (disposed) in the substrate 9.

The armature base 8 is disposed on a second side of the substrate 9 in the Y axis direction (on the upper side of FIGS. 1, 3A, and 3B). The armature base 8 includes two refrigerant conduits 10 along the X axis direction. In order to directly cool the armature 3, the refrigerant conduits 10 collect heat generated from the AC three-phase coils 11a and the single-phase coil 12. Disposing the refrigerant conduits 10 in the armature 3 leads to reduction in loss associated with coil heating, resulting in an efficient linear motor 1.

Referring again to FIG. 1, the second magnet row 7 of the field magnet 2 will be described in detail.

The second magnet row 7 of the field magnet 2 is disposed between the pair of field magnet yokes 4 and to the first side of the first magnet row 6 in the Y axis direction (on the lower side of FIG. 1), as described above. Specifically, the second magnet row 7 is disposed between the pair of field magnet yokes 4 and opposite a coil side portion 12a, which is on a first side of the single-phase coil 12 of the armature 3 in the Y axis direction. (The coil side portion 12a will be hereinafter occasionally referred to as a "first coil side portion 12a". See also FIGS. 3A and 3B.)

More specifically, the pair of Y-axis permanent magnets 7a of the second magnet row 7 are each longer than the first coil side portion 12a in the Y axis direction. The pair of Y-axis permanent magnets 7a are opposite the first coil side portion 12a between the pair of field magnet yokes 4 with a spacing S1 greater than a spacing S2 in a state without thrust generated in the Y axis direction. The spacing S1 is defined as a spacing (distance) in the Y axis direction between a first end of each of the pair of Y-axis permanent magnets 7a in the Y axis direction and a first end of the first coil side portion 12a in the Y axis direction. The spacing S2 is defined as a spacing (distance) in the Y axis direction between a second end of each of the pair of Y-axis permanent magnets 7a in the Y axis direction (the upper side of FIG. 1) and a second end of the first coil side portion 12a in the Y axis direction.

The linear motor 1 thus configured is capable of driving the armature 3 biaxially in the X and Y axis directions. Specifically, energizing the AC three-phase coils 11a of the armature 3 causes the AC three-phase coils 11a to have an effect with the closed loop of magnetic field for X axis driving. Specifically, an electromagnetic force is generated between the AC three-phase coils 11a and the first magnet row 6 of the field magnet 2. The electromagnetic force causes a thrust to drive the armature 3 in the X axis direction. Energizing the single-phase coil 12 of the armature 3 causes the single-phase coil 12 to have an effect with the closed loop L1 of magnetic field for Y axis driving. Specifically, an electromagnetic force is generated between the single-phase coil 12 and the second magnet row 7 of the field magnet 2. The electromagnetic force causes a thrust to drive the armature 3 in the Y axis direction.

A comparative embodiment will be described below by referring to FIG. 4 prior to reciting the advantageous effects of the above-described embodiment. FIGS. 4A and 4B are diagrams illustrating a schematic configuration of a field magnet 2 according to the comparative embodiment: FIG. 4A is a cross-sectional view of the field magnet 2 according to the comparative embodiment taken along the line IVA-IVA of FIG. 4B; and FIG. 4B shows the field magnet 2 according to the comparative embodiment as viewed from a side in a direction orthogonal to the X axis direction. FIGS. 4A and 4B respectively correspond to FIGS. 2A and 2B. For ease of comparison, like reference numerals designate corresponding or identical elements throughout FIGS. 2A, 2B, 4A, and 4B.

The linear motor 1 according to the comparative embodiment is approximately similar to the linear motor 1 according to the above-described embodiment. The difference is that in the linear motor 1 according to the comparative embodiment, the field magnet 2 includes two second magnet rows 7 in the Y axis direction. Specifically, as shown in FIGS. 4A and 4B, the field magnet 2 according to the comparative embodiment has two second magnet rows 7 disposed in the Y axis direction between the pair of field magnet yokes 4 and to the first side of the first magnet row 6 in the Y axis direction (on the lower side of FIG. 4). In other words, two pairs of Y-axis permanent magnets 7a form two rows in the Y axis direction on each of the pair of field magnet yokes 4. Hence, in the field magnet 2 according to the comparative embodiment, the two pairs of Y-axis permanent magnets 7a themselves form a closed loop of magnetic field L2 for Y axis driving. The linear motor 1 according to the comparative embodiment is otherwise similar to the linear motor 1 according to the above-described embodiment.

The following is noted as to the linear motor 1 according to the comparative embodiment. In the comparative embodiment, two pairs of Y-axis permanent magnets 7a are disposed along the Y axis direction, forming two rows. This makes the first magnet row 6 and the second magnet row 7 closer to one another, creating a possibility of mutual interference between the magnetic field for X axis driving formed by the first magnet row 6 and the magnetic field for Y axis driving formed by the second magnet row 7. The mutual interference of magnetic fields can increase leakage flux at the X and Y axes, creating a possibility of a low motor constant. Additionally, the mutual interference of magnetic fields can cause unevenness of air gap flux density at the X and Y axes, creating a possibility of increase in thrust ripple and side force.

Contrarily, in the linear motor 1 according to the above-described embodiment, a pair of Y-axis permanent magnets 7a are disposed along the Y axis direction, forming a single row (see, for example, FIGS. 2A and 2B). Thus, the number of rows of Y-axis permanent magnets 7a in the Y axis direction is smaller than in the comparative embodiment, where two pairs of Y-axis permanent magnets 7a are disposed along the Y axis direction, forming two rows, and the two pairs of Y-axis permanent magnets 7a themselves form the closed loop L2 of magnetic field. This ensures a substantial distance between the first magnet row 6 and the second magnet row 7, compared with the comparative embodiment. This in turn minimizes the mutual interference between the magnetic field for X axis driving formed by the first magnet row 6 and the magnetic field for Y axis driving formed by the second magnet row 7. The minimization of mutual interference in turn minimizes the lowering of a motor constant, which is otherwise caused by increase in leakage flux at the X and Y axes associated with mutual interference of magnetic fields. The minimization of mutual interference additionally minimizes increase in thrust ripple and side force, which is otherwise caused by unevenness of air gap flux density at the X and Y axes associated with mutual interference of magnetic fields. This minimizes adverse effects to various kinds of performance of machines and instruments in which the linear motor 1 can be mounted, providing the linear motor 1 with improved reliability.

It is particularly noted that in this embodiment, the second magnet row 7 is disposed to the first side of the first magnet row 6 in the Y axis direction, that is, on the side where the pair of field magnet yokes 4 are closed by the yoke base 5 (see, for example, FIGS. 2A and 2B). This reduces leakage of magnetic flux for Y axis driving formed by the second magnet row 7, compared with disposing the second magnet row 7 to the second side of the first magnet row 6 in the Y axis direction, that is, on the open side of the pair of field magnet yokes 4.

It is also particularly noted that in this embodiment, the second magnet row 7 is disposed opposite the first coil side portion 12a (see, for example, FIG. 1). This makes the second magnet row 7 closer to the first side of the first magnet row 6 in the Y axis direction, thereby further securing a substantial distance between the first magnet row 6 and the second magnet row 7. This further improves the effect of minimizing mutual interference of magnetic fields.

It is also particularly noted that in this embodiment, the second magnet row 7 is disposed with the spacing S1 greater than the spacing S2. This ensures advantageous effects that will be described in detail below. As shown in FIG. 1, the single-phase coil 12 has a coil side portion 12b on the second side of the single-phase coil 12 in the Y axis direction. (The coil side portion 12b will be hereinafter occasionally referred to as a "second coil side portion 12b". See also FIGS. 3A and 3B.) In the configuration of FIG. 1, where the second magnet row 7 is disposed opposite the first coil side portion 12a, the second coil side portion 12b is kept away from the second magnet row 7 and therefore insusceptible to the magnetic field formed by the second magnet row 7. However, when the armature 3 makes a relative movement, in relation to the field magnet 2, to the first side in the Y axis direction, the second coil side portion 12b approaches the second magnet row 7 and becomes adversely affected by the magnetic field formed by the second magnet row 7, resulting in a weakened thrust. Meanwhile, when the armature 3 makes a relative movement, in relation to the field magnet 2, to the second side in the Y axis direction, the second coil side portion 12b moves away from the second magnet row 7 and is approximately unaffected by the magnetic field formed by the second magnet row 7. This makes the thrust approximately uniform. Thus, the thrust of the linear motor 1 in the Y axis direction varies depending on the direction in which the armature 3 moves along the Y axis, resulting in an increase in thrust ripple.

In view of this, in this embodiment, the second magnet row 7 is disposed with the spacing S1 greater than the spacing S2, as described above. This ensures a relatively large distance D between the second coil side portion 12b and the second magnet row 7, even when the armature 3 makes a relative movement, in relation to the field magnet 2, to the first side in the Y axis direction. This in turn minimizes the reduction in thrust and the increase in thrust ripple.

FIG. 5 is a diagram illustrating the distance D in the case of the relative movement of the armature 3 to the first side in the Y axis direction. FIG. 5 is similar to FIG. 1 except that the armature 3 makes a relative movement, in relation to the field magnet 2, from the position shown in FIG. 1 to the first side in the Y axis direction. In FIGS. 1 and 5, the distance D is defined as a distance between the second coil side portion 12b and the second magnet row 7 (in this embodiment, the distance between a first end of the second coil side portion 12b in the Y axis direction and a second end of each of the pair of Y-axis permanent magnets 7a on the second side in the Y axis direction). As shown in FIG. 5, when the armature 3 makes a relative movement, in relation to the field magnet 2, to the first side in the Y axis direction (which is the lower side of FIGS. 1 and 5) from the position shown in FIG. 1, the distance D is smaller than in the case where the armature 3 is located at the position shown in FIG. 1. Still, disposing the second magnet row 7 with the spacing S1 greater than the spacing S2 keeps the distance D relatively large.

It is also particularly noted that in this embodiment, the yoke base 5 is made of magnetic material such as iron. Use of magnetic material for the yoke base 5 ensures reliable formation of the closed loop L1 of magnetic field for Y axis driving by the pair of Y-axis permanent magnets 7a, which are disposed to the first side of the first magnet row 6 in the Y axis direction, and the yoke base 5 made of magnetic material. Use of magnetic material for the yoke base 5 also reduces leakage flux. This results in an increase in thrust in the Y axis direction.

It will be appreciated that the present invention will not be limited to the embodiment described above, but various modifications are possible without departing from the technical scope of the present invention. Such modification embodiments will be described below.

(1) The Second Magnet Row Disposed to the Second Side of the First Magnet Row in the Y Axis Direction While in the above-described embodiment the second magnet row 7 of the field magnet 2 is disposed to the first side of the first magnet row 6 in the Y axis direction, this should not be construed in a limiting sense. The second magnet row 7 may be disposed to the second side of the first magnet row 6 in the Y axis direction.

FIG. 6 is a cross-sectional view of a linear motor 1 according to a modification embodiment, taken along a direction orthogonal to the X axis direction to illustrate a schematic configuration of the linear motor 1. FIG. 6 corresponds to FIG. 1. Like reference numerals designate corresponding or identical elements throughout FIGS. 1 and 6, and therefore such elements will not be further elaborated here. In FIG. 1, a direction perpendicular to the paper plane corresponds to the X axis direction, while the vertical direction corresponds to the Y axis direction.

The linear motor 1 according to the modification embodiment differs from the linear motor 1 according to the above-described embodiment in the position of the first and second magnet rows 6 and 7 of the field magnet 2 and in the position of the first armature coil row 11 and the single-phase coil 12 of the armature 3.

Specifically, as shown in FIG. 6, in the linear motor 1 according to the modification embodiment, the first magnet row 6, which includes a plurality of pairs of X-axis permanent magnets 6a, is disposed between the pair of field magnet yokes 4 and on the first side of the pair of field magnet yokes 4 in the Y axis direction (on the lower side of FIG. 6). In other words, the first magnet row 6 is disposed on the side where the pair of field magnet yokes 4 are closed by the yoke base 5. In the modification embodiment, disposing the plurality of pairs of X-axis permanent magnets 6a of the first magnet row 6 in this manner results in formation a closed loop of magnetic field for X axis driving by adjacent two pairs of X-axis permanent magnets 6a, similarly to the above-described embodiment. In the linear motor 1 according to the modification embodiment, the first armature coil row 11 (in other words, a plurality of AC three-phase coils 11a) is disposed in the substrate 9 opposite the first magnet row 6. The first armature coil row 11 is molded into a plate shape by resin molding and secured in the substrate 9.

Also in the linear motor 1 according to the modification embodiment, the second magnet row 7, which includes a pair of Y-axis permanent magnets 7a forming a single row, is disposed between the pair of field magnet yokes 4 and to the second side of the first magnet row 6 in the Y axis direction (on the upper side of FIG. 6). In other words, the second magnet row 7 is disposed on the open side of the pair of field magnet yokes 4. In the modification embodiment, a closed loop L3 of magnetic field for Y axis driving is formed by the pair of Y-axis permanent magnets 7a of the second magnet row 7, the pair of field magnet yokes 4, and the yoke base 5, as opposed to the above-described embodiment. In the linear motor 1 according to the modification embodiment, the single-phase coil 12 is disposed to the second side of the first armature coil row 11 in the Y axis direction, that is, at a position of the substrate 9 opposite the second magnet row 7. The single-phase coil 12 is molded into a plate shape by resin molding and secured in the substrate 9.

The second magnet row 7 according to the modification embodiment, specifically, is disposed opposite the second coil side portion 12b between the pair of field magnet yokes 4. More specifically, the pair of Y-axis permanent magnets 7a of the second magnet row 7 according to the modification embodiment are longer than the second coil side portion 12b in the Y axis direction. The pair of Y-axis permanent magnets 7a are opposite the second coil side portion 12b between the pair of field magnet yokes 4 with a spacing S3 greater than a spacing S4. The spacing S3 is defined as a spacing (distance) in the Y axis direction between the second end of each of the pair of Y-axis permanent magnets 7a in the Y axis direction and the second end of the second coil side portion 12b in the Y axis direction. The spacing S4 is defined as a spacing (distance) in the Y axis direction between the first end of each of the pair of Y-axis permanent magnets 7a in the Y axis direction and the first end of the second coil side portion 12b in the Y axis direction.

The linear motor 1 according to the modification embodiment is otherwise similar to the linear motor 1 according to the above-described embodiment.

As described in the modification embodiment, the second magnet row 7 is disposed to the second side of the first magnet row 6 in the Y axis direction, that is, on the open side of the pair of field magnet yokes 4. In this case, a closed loop L3 of magnetic field is formed as if to surround the first magnet row 6 by the pair of Y-axis permanent magnets 7a disposed to the yoke open side of the first magnet row 6, the pair of field magnet yokes 4, and the yoke base 5. An electromagnetic force is generated between the second magnet row 7 and the single-phase coil 12 to drive the armature 3 in the Y axis direction. Also in the modification embodiment, a single pair of Y-axis permanent magnets 7a are disposed along the Y axis direction, forming a single row. This ensures a substantial distance between the first magnet row 6 and the second magnet row 7, similarly to the above-described embodiment. Thus, the second magnet row 7 can be disposed not only to the first side but also to the second side of the first magnet row 6 in the Y axis direction, providing improved flexibility to the second magnet row 7 layout.

(2) The Linear Motor as Applied to a Stage Device

The linear motor 1 according to the above-described embodiment and the linear motor 1 according to the modification embodiment described in (1) may be used as driving sources of linear motion mechanisms in stage devices. An exemplary stage device is described below. The stage device includes a linear motor, a stage, and linear guides. The linear motor is movable on a fixed base. The stage is disposed over the linear motor. The linear guides are disposed on the fixed base and the linear motor, and include a slider and a guide track. The linear motor of the stage device is the linear motor 1 according to the above-described embodiment or the linear motor 1 according to the modification embodiment described in (1). In this stage device, the linear motor drives the stage in the X and Y axis directions. Thus, the linear motor is used as a driving source of the linear motion mechanism in the stage device. As described above, the linear motor minimizes mutual interference between the magnetic field for X axis driving formed by the first magnet row 6 and the magnetic field for Y axis driving formed by the second magnet row 7. Use of such linear motor as a driving source of the linear motion mechanism ensures a highly reliable stage device.

(3) Other Embodiments

While in the above-described embodiments the field magnet 2 serves as the stator and the armature 3 serves as the rotor that is movable in the X and Y axis directions, this should not be construed in a limiting sense. Inversely, the field magnet may serve as the rotor and the armature may serve as the stator, with the field magnet movable in the X and Y axis directions. This ensures similar advantageous effects to the advantageous effects by the above-described embodiments.

Otherwise, the above-described embodiments and modification embodiment may be combined in any manner deemed suitable.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A linear motor having an X axis direction and a Y axis direction orthogonal to the X axis direction, the linear motor comprising:
    a field magnet serving as one of a rotor and a stator, the field magnet comprising:
        a pair of planar, mutually opposing field magnet yokes;
        a yoke base on a first end of each of the pair of field magnet yokes in the Y axis direction; and
        only two magnet rows with a first magnet row and a second magnet row,
            the first magnet row being between the pair of field magnet yokes, the first magnet row comprising a plurality of mutually opposing pairs of first magnets along the X axis direction, the first magnets of each of the pairs having mutually different polarities, and
            the second magnet row being between the pair of field magnet yokes, the second magnet row being to at least one of a first side and a second side of the first magnet row in the Y axis direction, the second magnet row comprising a pair of mutually opposing second magnets having mutually different polarities, the pair of mutually opposing second magnets forming only a single row in the Y axis direction on each of the pair of field magnet yokes, the pair of mutually opposing second magnets each having a unitary structure and each having north and south poles aligned to extend in a Z direction that is orthogonal to both the X axis direction and the Y axis direction; and
    an armature serving as another one of the rotor and the stator, the armature comprising:
        a first armature coil opposite the first magnet row; and
        a second armature coil opposite the second magnet row,
    wherein the rotor is movable in the X axis direction and the Y axis direction, and
    wherein the second magnet row with the yoke base forms a closed loop of magnetic field for driving the rotor in the Y axis direction.

2. The linear motor according to claim 1, wherein the second magnet row is to the first side of the first magnet row in the Y axis direction.

3. The linear motor according to claim 1, wherein the second magnet row is to the second side of the first magnet row in the Y axis direction.

4. The linear motor according to claim 2,
    wherein the second armature coil of the armature has a first coil side portion in the Y axis direction, and
    wherein the second magnet row and the first coil side portion are facing opposite each other.

5. The linear motor according to claim 4,
    wherein the pair of second magnets of the second magnet row are each longer in the Y axis direction than the first coil side portion of the second armature coil,
    wherein the pair of second magnets each have a first end and a second end in the Y axis direction, and the first coil side portion has a first end and a second end in the Y axis direction, and
    wherein a spacing between the first end of each of the pair of second magnets and the first end of the first coil side portion in the Y axis direction is greater than a spacing between the second end of each of the pair of second magnets and the second end of the first coil side portion in the Y axis direction.

6. The linear motor according to claim 1, wherein the yoke base comprises a magnetic material.

7. A stage device comprising:
a linear motor having an X axis direction and a Y axis direction orthogonal to the X axis direction, the linear motor being a driving source of a linear motion mechanism, the linear motor comprising:
  a field magnet serving as one of a rotor and a stator, the field magnet comprising:
    a pair of planar, mutually opposing field magnet yokes;
    a yoke base on a first end of each of the pair of field magnet yokes in the Y axis direction; and
    only two magnet rows with a first magnet row and a second magnet row,
      the first magnet row being between the pair of field magnet yokes, the first magnet row comprising a plurality of mutually opposing pairs of first magnets along the X axis direction, the first magnets of each of the pairs having mutually different polarities, and
      the second magnet row being between the pair of field magnet yokes, the second magnet row being to at least one of a first side and a second side of the first magnet row in the Y axis direction, the second magnet row comprising a pair of mutually opposing second magnets having mutually different polarities, the pair of mutually opposing second magnets forming only a single row in the Y axis direction on each of the pair of field magnet yokes, the pair of mutually opposing second magnets each having a unitary structure and each having north and south poles aligned to extend in a Z direction that is orthogonal to both the X axis direction and the Y axis direction; and
  an armature serving as another one of the rotor and the stator, the armature comprising:
    a first armature coil opposite the first magnet row; and
    a second armature coil opposite the second magnet row,
wherein the rotor is movable in the X axis direction and the Y axis direction, and
wherein the second magnet row with the yoke base forms a closed loop of magnetic field for driving the rotor in the Y axis direction.

* * * * *